United States Patent
Furman et al.

(10) Patent No.: US 10,509,683 B2
(45) Date of Patent: Dec. 17, 2019

(54) MODELING RESOURCE USAGE FOR A JOB

(71) Applicant: Microsoft Technology Licensing, LLC, Redmond, WA (US)

(72) Inventors: Michael Furman, San Jose, CA (US); Yifung Lin, Beijing (CN); Deyang Song, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 15/153,603

(22) Filed: May 12, 2016

(65) Prior Publication Data

US 2017/0090990 A1    Mar. 30, 2017

Related U.S. Application Data

(60) Provisional application No. 62/233,137, filed on Sep. 25, 2015.

(51) Int. Cl.
*G06F 9/46* (2006.01)
*G06F 9/50* (2006.01)

(52) U.S. Cl.
CPC .................................. *G06F 9/5061* (2013.01)

(58) Field of Classification Search
None
See application file for complete search history.

(56) References Cited

U.S. PATENT DOCUMENTS

| | | | |
|---|---|---|---|
| 6,341,371 B1 * | 1/2002 | Tandri | G06F 8/452 |
| | | | 712/200 |
| 7,958,511 B1 | 6/2011 | Pomerantsev et al. | |
| 9,262,216 B2 * | 2/2016 | Bodik | G06F 9/4887 |
| 2004/0179528 A1 * | 9/2004 | Powers | G06Q 10/06 |
| | | | 370/392 |
| 2007/0067296 A1 * | 3/2007 | Malloy | H04L 41/145 |
| 2007/0124274 A1 * | 5/2007 | Barsness | G06F 17/30312 |
| 2007/0220516 A1 * | 9/2007 | Ishiguro | G06F 9/505 |
| | | | 718/101 |
| 2008/0021987 A1 * | 1/2008 | Bates | G06F 9/5044 |
| | | | 709/223 |
| 2010/0058086 A1 * | 3/2010 | Lee | G06F 1/3203 |
| | | | 713/322 |

(Continued)

OTHER PUBLICATIONS

Ke, et al., "Optimizing Data Partitioning for Data-Parallel Computing", In Proceedings of the 13th USENIX conference on Hot topics in operating systems, May 9, 2011, pp. 1-5.

(Continued)

*Primary Examiner* — Hiren P Patel
(74) *Attorney, Agent, or Firm* — Workman Nydegger

(57) ABSTRACT

Simulation of a computational job using various sets of resources, and potentially also the automated or semi-automated allocation of an appropriate set of resources for accomplishing a computational job comprising multiple vertices. For each of multiple potential sets of resources, a simulation module simulates processing of the computational job. While the simulation does not actually perform the vertex on each processing node, the simulation does use dependencies between vertices, and historical data regarding the processing of instances of such vertices, in order to determine the efficacy of processing of each vertex, and to put the estimations together into an overall simulation result.

20 Claims, 5 Drawing Sheets

(56) References Cited

U.S. PATENT DOCUMENTS

| | | | | |
|---|---|---|---|---|
| 2010/0131949 | A1* | 5/2010 | Ferris | G06F 9/5027 718/1 |
| 2011/0061057 | A1* | 3/2011 | Harris | G06F 9/5072 718/104 |
| 2011/0209157 | A1* | 8/2011 | Sumida | G06F 9/5016 718/104 |
| 2012/0030679 | A1* | 2/2012 | Ferdous | G06F 9/5044 718/101 |
| 2012/0066206 | A1* | 3/2012 | Chappell | G06F 17/30445 707/713 |
| 2012/0198466 | A1* | 8/2012 | Cherkasova | G06F 9/5066 718/104 |
| 2012/0222032 | A1 | 8/2012 | Ferdous et al. | |
| 2012/0284719 | A1* | 11/2012 | Phan | G06F 9/4843 718/101 |
| 2012/0317578 | A1 | 12/2012 | Kansal et al. | |
| 2013/0013283 | A1* | 1/2013 | Gam | G06F 17/5022 703/21 |
| 2013/0212277 | A1* | 8/2013 | Bodik | G06F 9/4887 709/226 |
| 2013/0318538 | A1* | 11/2013 | Verma | G06F 9/50 718/104 |
| 2013/0339972 | A1* | 12/2013 | Zhang | G06F 9/5066 718/104 |
| 2013/0346988 | A1* | 12/2013 | Bruno | G06F 9/5066 718/102 |
| 2014/0095693 | A1* | 4/2014 | Apte | H04L 67/1008 709/224 |
| 2014/0325521 | A1* | 10/2014 | Li | G06F 9/5038 718/104 |
| 2014/0337648 | A1* | 11/2014 | Ujibashi | G06F 1/324 713/322 |
| 2014/0380307 | A1* | 12/2014 | Zhu | G06F 9/45533 718/1 |
| 2015/0150023 | A1* | 5/2015 | Johnson | G06F 9/5027 718/107 |
| 2015/0199218 | A1 | 7/2015 | Wilson et al. | |
| 2015/0220370 | A1* | 8/2015 | Ujibashi | G06F 9/5088 718/104 |
| 2015/0227393 | A1 | 8/2015 | Fuller et al. | |
| 2015/0277980 | A1* | 10/2015 | Ovsiankin | G06F 9/5066 718/104 |
| 2015/0317189 | A1* | 11/2015 | Georgescu | G06F 9/50 718/104 |
| 2016/0261711 | A1* | 9/2016 | Blum | H04L 47/783 |
| 2017/0200113 | A1* | 7/2017 | Cherkasova | G06F 9/5072 |

OTHER PUBLICATIONS

Pietri, et al., "A Performance Model to Estimate Execution Time of Scientific Workflows on the Cloud", In Proceedings of the 9th Workshop on Workflows in Support of Large-Scale Science, Nov. 16, 2014, 9 pages.

Warneke, et al., "Exploiting Dynamic Resource Allocation for Efficient Parallel Data Processing in the Cloud", In Proceedings of IEEE Transactions on Parallel and Distributed Systems, vol. 22, Issue 6, Feb. 10, 2011, 18 pages.

Sriram, et al., "Dynamic Resource Parallel Processing and Scheduling by Using Virtual Machine in the Cloud Environment", In International Journal of Engineering Research & Technology, vol. 3, Issue 4, Apr. 2014, pp. 1265-1269.

Kuntraruk, et al., "Application Resource Requirement Estimation in a Parallel-Pipeline Model of Execution", In Proceedings of IEEE Transactions on Parallel and Distributed Systems, vol. 16, No. 12, Dec. 2005, pp. 1154-1165.

Singh, et al., "A Comparative Analysis of Resource Scheduling Algorithms in Cloud Computing", In American Journal of Computer Science and Engineering Survey, vol. 1, No. 1, Dec. 2013, 4 pages.

Raj, et al., "An Approach for Optimization of Resource Management in Hadoop", In Proceedings of International on Conference Computer and Communications Technologies, Dec. 11, 2014, 8 pages.

El-Zoghdy, et al., "An Efficient Algorithm for Resource Allocation in Parallel and Distributed Computing Systems", In International Journal of Advanced Computer Science and Applications, vol. 4, Issue 2, Mar. 2013, pp. 251-259.

Hussain, et al., "A Survey on Resource Allocation in High Performance Distributed Computing Systems", In Journal of Parallel Computing, vol. 39, Issue 11, Nov. 2013, 1 page.

Shestak, et al., "Robust resource allocations in parallel computing systems: model and heuristics", In Proceedings of 8th International Symposium on Parallel Architectures, Algorithms and Networks, Dec. 7, 2005, 11 pages.

* cited by examiner

MODELING RESOURCE USAGE FOR A JOB

CROSS-REFERENCE TO RELATED APPLICATION

This application claims the benefit of U.S. Provisional Patent Application Ser. No. 62/233,137 filed Sep. 25, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing large amounts of data (often referred to simply as "big data") that itself might be distributed across multiple network nodes, it is often most efficient to divide data processing amongst the various network nodes. These divisions of logical work are often referred to as "vertices" in the plural, or a "vertex" in the singular. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

When running a job, the speed at which the job completes will depend on the number of resources (e.g., processing nodes, cores, memory, network bandwidth, disk IO bandwidth and so forth). Some types of resources will have greater effect on the efficiency of job completion than others. For instance, processing cores and memory typically have greater impact on processing efficiency.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to simulation of a computational job using various sets of resources, and potentially also the automated or semi-automated allocation of an appropriate set of resources for accomplishing a computational job comprising multiple vertices. For each of multiple potential sets of resources, a simulation module simulates processing of the computational job. While the simulation does not actually perform the vertex on each processing node, the simulation does use dependencies between vertices, and historical data regarding the processing of instances of such vertices, in order to determine the efficacy of processing of each vertex, and to put the estimations together into an overall simulation result.

In some embodiments, a resource set recommendation module applies a set of one or more rules to selected one or more recommended sets of resources for performing the computational job. In a fully automated environment, the resource set recommendation module would then trigger allocation of the recommended set of resources, and processing of the computational job using those recommended set of resources. In the semi-automated embodiment, a user interface may present result of the simulations to the user, and perhaps provide recommendations for sets of resources that could be used. The user could then interact with a control of the user interface to select the desired set of resources to be used for the computation job, thereby triggering the resource allocation and job processing. In yet another embodiment, the user might be presented with a user interface that charts efficiency with the number of resources, allowing the user to get a sense for the point of diminishing return in how many resources to use.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to simulation of a computational job using various sets of resources, and potentially also the automated or semi-automated allocation of an appropriate set of resources for accomplishing a computational job comprising multiple vertices. For each of multiple potential sets of resources, a simulation module simulates processing of the computational job. While the simulation does not actually perform the vertex on each processing node, the simulation does use dependencies between vertices, and historical data regarding the processing of instances of such vertices, in order to determine the efficacy of processing of each vertex, and to put the estimations together into an overall simulation result.

In some embodiments, a resource set recommendation module applies a set of one or more rules to selected one or more recommended sets of resources for performing the computational job. In a fully automated environment, the resource set recommendation module would then trigger allocation of the recommended set of resources, and processing of the computational job using those recommended set of resources. In the semi-automated embodiment, a user interface may present result of the simulations to the user, and perhaps provide recommendations for sets of resources that could be used. The user could then interact with a control of the user interface to select the desired set of resources to be used for the computation job, thereby triggering the resource allocation and job processing. In yet another embodiment, the user might be presented with a user interface that charts efficiency with the number of resources, allowing the user to get a sense for the point of diminishing return in how many resources to use.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
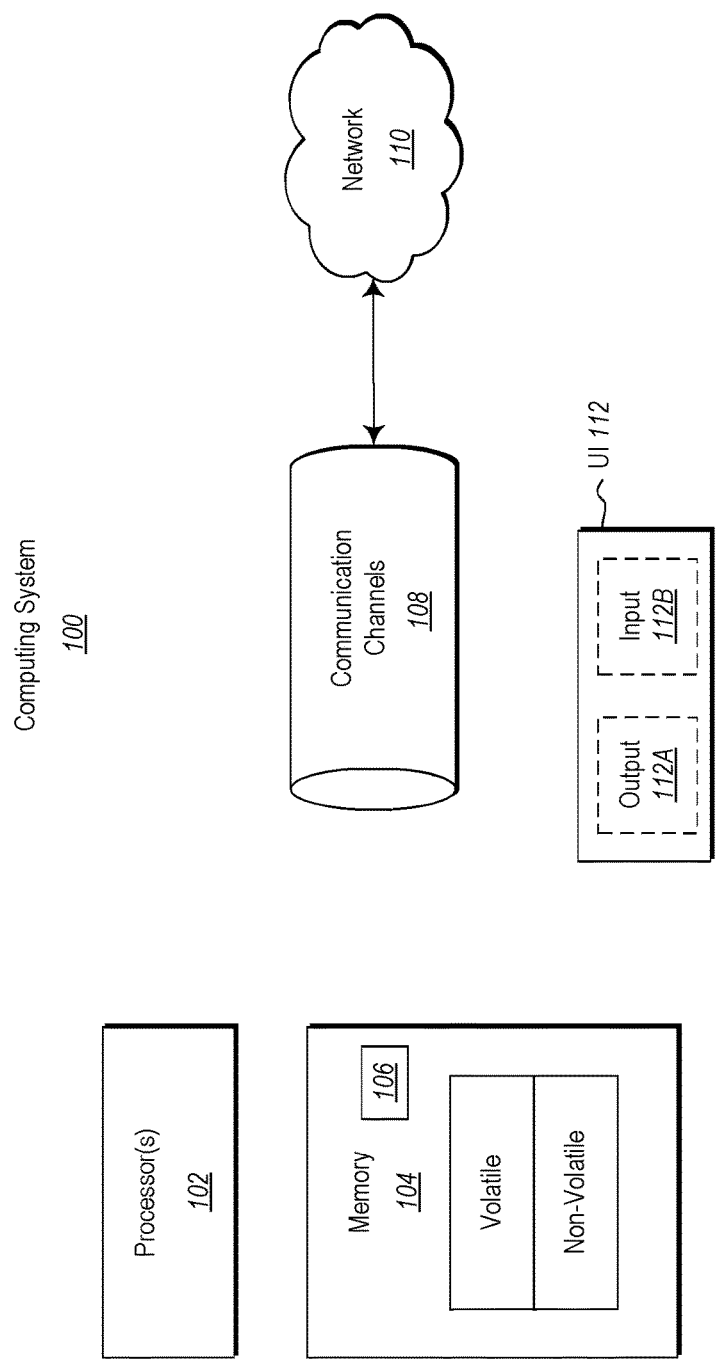
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "monitor", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms and so forth. Examples of input mechanisms 112B might include, for instance, microphones, touchscreens, holograms, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another an communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
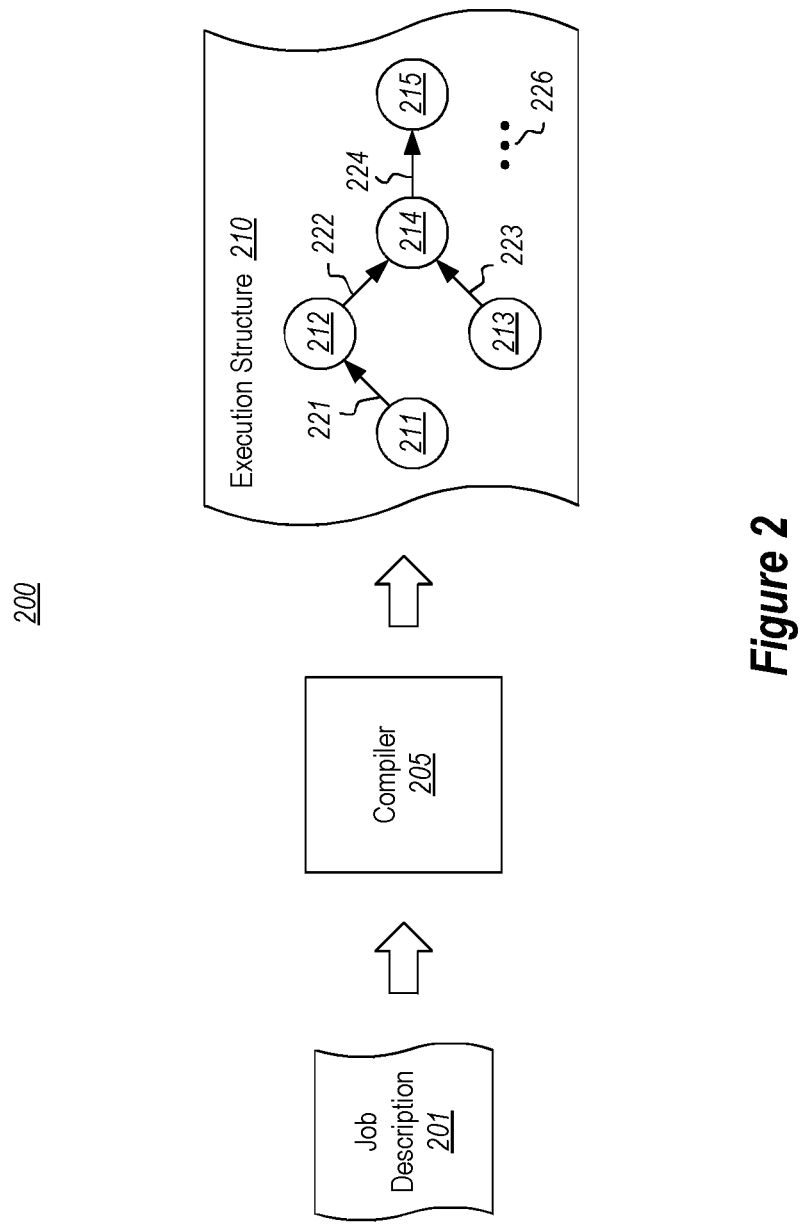
FIG. 2 illustrates an architecture in which a job description is compiled by a compiler into an execution structure.

FIG. 2 illustrates an architecture 200 in which a job description 201 is compiled by a compiler 205 into an execution structure 210. The compiler 205 may, for instance, be a computing system such as the computing system 100 described above with respect to FIG. 1. The compiler 205 may alternatively or more specifically be an executable component (such as the executable component 106) that runs on a computing system (such as the computing system 100). In one example, the job description 201 may be a query. However, the job description 201 may be any definition of a computational job to be accomplished.

In FIG. 2, the execution structure 210 is illustrated as including five vertices 211 through 215 (as represented as circles) that have certain dependences 221 through 224 (as represented by arrows 221 through 224). However, the ellipses 226 represent that the principles described herein are not limited to the exact structure of the execution structure 210. The execution structure 210 will depend on the job to be accomplished (i.e., the job description 201), how the compiler 210 decides the job is to be divided into smaller logical tasks (referred to as a vertex), and the dependencies that exist between those vertices. In the most trivial case, the execution structure may simply be a single vertex. In more complex cases, the execution structure may comprise thousands or even perhaps millions of vertices. In any case, the principles described herein are applicable regardless of the execution structure, how many vertices exist in the execution structure, and how the vertices are interrelated.

Figure 3:
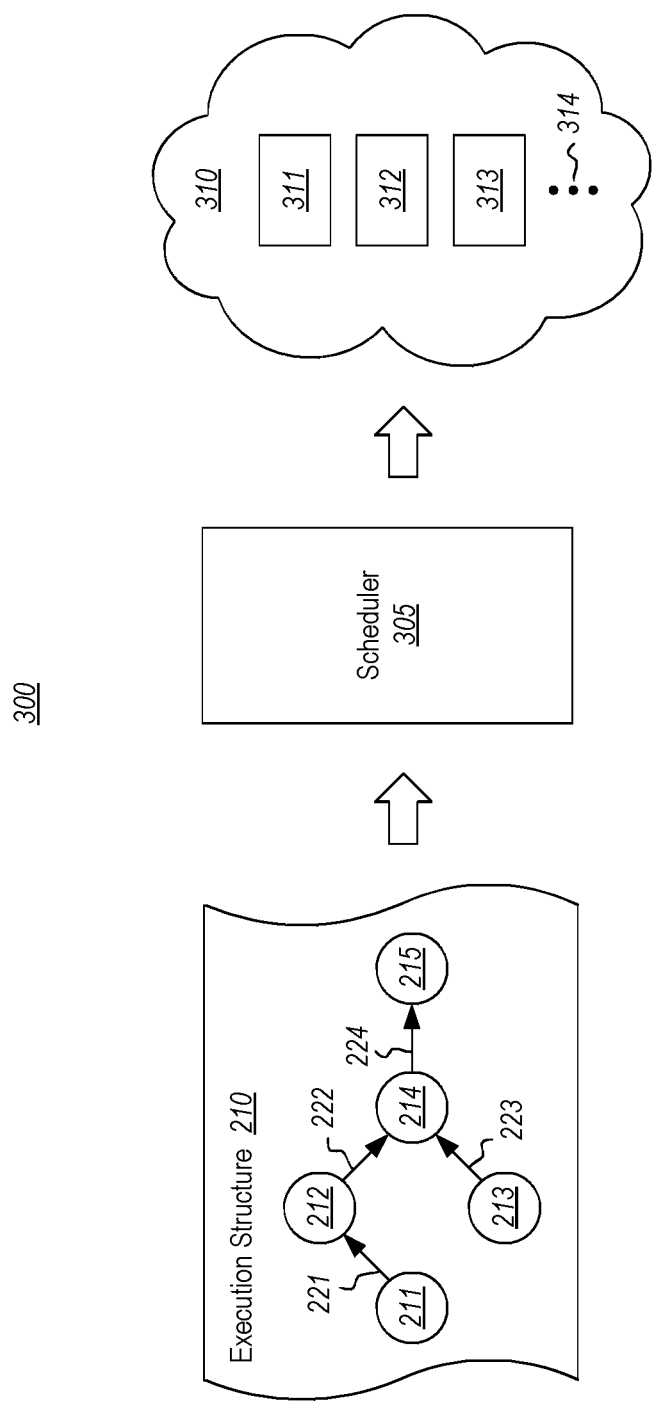
FIG. 3 illustrates an environment in which a scheduler uses the execution structure to determine when the tasks associated with a vertex is to be performed, and on what processing node within a distributed environment.

FIG. 3 illustrates an environment 300 in which a scheduler module 305 uses the execution structure 210 to determine when the tasks associated with a vertex is to be performed, and on what processing node within a distributed environment 310. Again the scheduler 305 may be a computing system such as the computing system 100 of FIG. 1, or may be software (such as executable component 106) that executes on such a computing system. The distributed environment 310 is illustrated as including three processing nodes 311 through 313, though the ellipses 314 symbolizes that the distributed environment may include any number of processing nodes capable of performing tasks of the job represented by the execution structure 210. In one embodiment, the distributed environment 310 is a cloud computing environment. The scheduler module 305 has a concept for the set of resources that are allocated for performance of the computational job.

Figure 4:
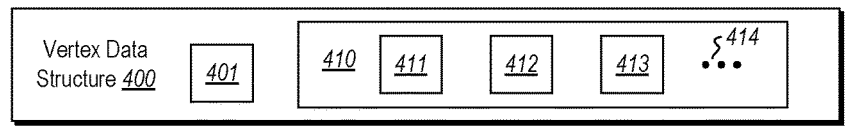
FIG. 4 illustrates a vertex data structure that includes a variety of fields including a vertex identifier and operational data.

FIG. 4 illustrates a vertex data structure 400 that includes a variety of fields including a vertex identifier 401 and operational data 410. The vertex data structure 400 includes a variety of fields including a vertex identifier 401 and operational data 410. The operational data 410 includes information regarding execution of the vertex on the associated processing node scheduled by the scheduler. For instance, the operational data 410 may include a processing node identifier 411, a job result indication 412, a duration field 413 and so forth (as represented by the ellipses 414).

Figure 5:
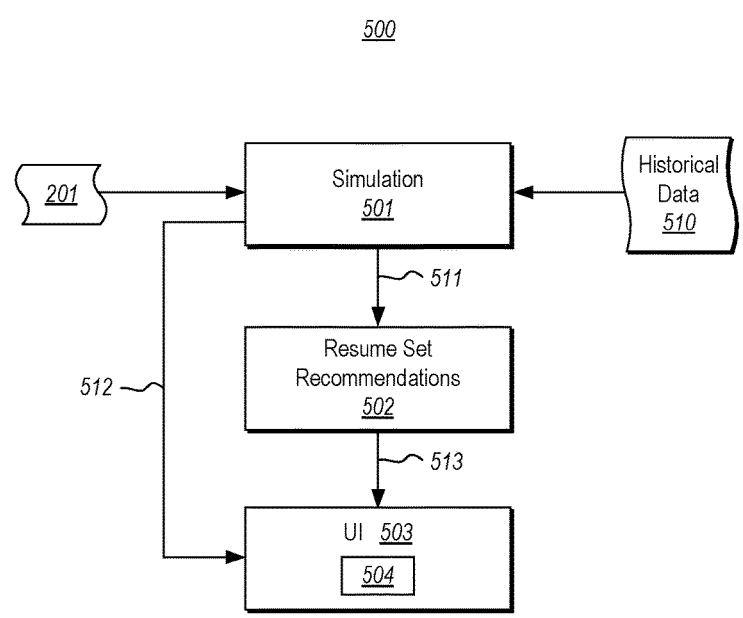
FIG. 5 illustrates a job execution visualization infrastructure in accordance with the principles described herein, which includes a processing gathering module as well as a user interface module.

FIG. 5 illustrates resource selection architecture 500 for use in selecting a set of resources to be used in performing a computational job. The vertices of the computational job have been previously performed so as to obtain information regarding that prior execution of each vertex, such as duration (or begin time and end time) and dependencies. From this data, simulations can then be run changing one or more parameters in the execution environment (such as the number of processing nodes allocated to the computational job).

Computational jobs can take significant time to perform, often in the hours or even days timeframe. Appropriate selection of an amount of resources to be used in order to perform that job is very important and can mean orders of magnitude difference in the time it takes to complete the computational job. On the other hand, if too many resources are allocated for a job, then there is risk of wasting potential resources during the processing of the job, with little to no benefit in reducing the duration of the job. Accordingly, appropriate selection of the set of resources to be allocated is important.

Unfortunately, the appropriate selection is far from clear even for an experienced professional. Accordingly, the resource selection architecture 500 provides valuable technical tools that provide significant insight into the appropriate set of resources to be allocated to a particular job. The resource selection architecture 500 may further trigger initiation of the allocation of the resources and performance of the job automatically, or perhaps with some user input.

The simulation module 501 receives an execution structure 210 associated with a computational job. This execution structure 210 includes the portions (also called "vertices" in the plural, or a "vertex" in the singular), as well as dependencies between the vertices. The simulation module 501 then repeatedly simulates performance of the computational job using different amounts of resources. However, the computational job is not actually performed for each simulation. Instead, the amount of time it would take to complete the computational job is estimated based on the resource set for that simulation, as well as historical data regarding the performance of the various vertices of the computational job.

For instance, for a given simulation, the simulation module 501 selects a resource set for use in a simulation. Historical data 510 may be used to estimate how long it takes to complete each vertex in the given simulation. This data may be combined with the dependency information to determine about how long it would take to complete a computational job using the set of resources. When a vertex is to begin for a given simulation, the simulation module makes sure there is a resource available to perform the vertex, and marks that resources as not available for the expected duration of the vertex processing. If all resources are marked as unavailable for a given time, then the simulation module cannot begin any new vertices, even for those whose dependencies are completed. A simulation for a pipeline of jobs for a given set of resources can be similarly performed by separately determining the duration of each job that would be sufficient such that the next job could be commenced.

In some embodiments, the set of resources may be considered as a unit bundle. For instance, a token might represent a certain number of processing cores and memory space. Thus, the amount of resources may be more easily measured by the number of such tokens to be used. In token based resource allocation, a scheduler may use a token to begin a new task, and the token is considered in use during execution of the vertex, and returned to the scheduler upon completion of the vertex. Accordingly, by providing the scheduler a certain number of tokens, appropriate resource allocation can be made. The problem remains, however, in determining an appropriate number of tokens to give to the scheduler for a particular computational job.

A simple example will now be provided by way of example only. In this example, there are only two nodes—node A and node B, node B having a dependency on node A. Node A has three vertices that can each be performed in parallel, and given one unit set of resources (corresponding to a token), are each expected to take 10 minutes. Node B has two vertices that can each be performed in parallel, and given one unit set of resources (corresponding to a token), are each expected to take 1 minute.

For a first simulation, there is simply one unit set of resources available to complete the computational job. Accordingly, node A will take 30 minutes as one resource set only allows for the three vertices of node A to be performed in series, and each vertex takes 10 minutes to complete for node A. Node B will take 2 minutes as again only one resource set only allows for the two vertices of node B to be performed in series. Accordingly, for the first resource set corresponding to one available unit of resources (e.g., one token), the computational job would take 32 minutes to complete.

For a second simulation, there are two unit sets of resources available to complete the computational job. Accordingly, node A would take 20 minutes to complete. In the first ten minutes, two of the three vertices of node A could be performed in parallel. In the second ten minutes, the last vertex of node A could be performed. Node B would only take 1 minute to complete as both vertices could be performed in parallel. Thus, with the addition of another set of resources (one additional token), the computational job would now take only 21 minutes to complete.

For a third simulation, there are three unit sets of resources available to complete the computational job. Accordingly, node A would take 10 minutes to complete since there is now an appropriate set of resources available for each of the three vertices of node A to complete in parallel. Node B would again only take 1 minute to complete as again there is a resource set available for each vertex of node B to be performed in parallel. Thus, with the addition of yet another set of resources (one additional token), the computational job would now take only 11 minutes to complete. Additional resource sets will not further reduce the estimated time for processing of the computational job.

This example has been kept unusually simple to illustrated how tokens may be used to repeatedly perform simulation on different available resources, depending on historical statistics on vertex performance, and dependencies. In the more typical case, more refined statistical performance data may be used in the estimation. Furthermore, in a more typical cases, the number of nodes, vertices per node, and complexity of dependencies may be increased. The use of tokens becomes especially useful to simplify the estimation for more complex situations.

In any case, the simulation module 501 returns (as represented by arrow 511) multiple potential sets of resources, and an expected duration for each set of resources. A resource set recommendation module 502 receives these simulation results (again as represented by arrow 511), and applies a set of one or more rules to select one or more recommended sets of resources for performing the computational job. In one embodiment, the resource set recommendation module 502 may also automatically select one of the recommended sets of resources, allocate the same, and trigger the initiation of processing of the computational job using those allocated resources.

In other cases, user input may be obtained. In the semi-automated embodiment, a user interface may present result of the simulations to the user, and perhaps provide recommendations for sets of resources that could be used. The user could then interact with a control of the user interface to select the desired set of resources to be used for the computation job, thereby triggering the resource allocation and job processing. In yet another embodiment, the user might be presented with a user interface that charts efficiency with the number of resources, allowing the user to get a sense for the point of diminishing return in how many resources to use.

The set of rules for generating recommended sets of resources may be simple or complex. In one embodiment, one of the rules simply sets a maximum useful time, and any set of resources would have to correspond to a simulation that resulted in a duration that is prior to that maximum useful time. Other parameters might include "complete by" parameters in which a deadline is specified. Other rules might specify that as many resources as possible should be allocated so long as each addition resource unit contributes a certain amount to reduced duration, which might be referred to as following the rule of diminishing returns. The principles described herein are not, however, limited to the specific rules in determining recommended sets of resources.

A user interface module 503 presents results of the multiple simulations to a user. In one embodiment, the user interface module 503 might graph the number of resource units (e.g., tokens) against the anticipated duration (e.g., with the resource set represented on one axis and with the duration of the computational job on another axis). These results are received as represented by arrow 512. The recommendations generated by the resource set recommendation module 502 (as represented by arrow 503) may also be presented by the user interface module 503.

The user interface module 503 may also have a control 504 that the user may interact with in order to select the set of resources to be used in performing the computational job. This may further cause the set of resources to be allocated, and the computational job to be performed for instance, using the scheduler 205.

Figure 6:
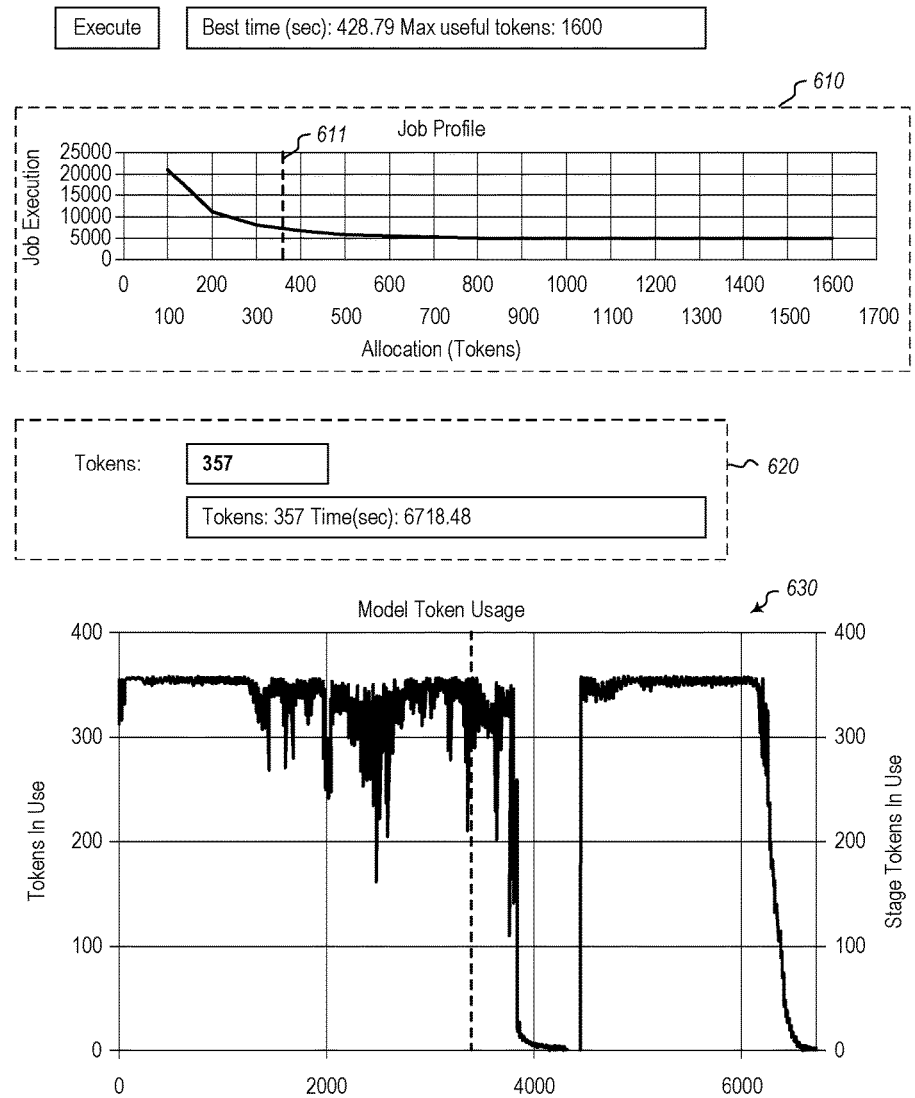
FIG. 6 illustrates an example user interface that may be presented by the user interface module of FIG. 5, and which illustrates a job profile portion, a recommendation portion, and a model token usage portion.

FIG. 6 illustrates an example user interface 600 that may be an example of the user interface presented by the user interface module 503 of FIG. 5. In this example, the simulation was performed in increments of one token ranging from 100 tokens to 1600 tokens. A plot portion 610 shows a report in which the estimated time of execution of the computational job is plotted (on the vertical axis) against the number of tokens (on the horizontal axis). A vertical line 611 shows a recommended level of tokens to use for a given computational job given diminishing returns.

A model token usage portion 630 shows the estimated number of tokens in use (on the vertical axis) plotted against time (on the horizontal axis). Note that there are many times in which the number of tokens in use is close to the maximum level of 357, whereas at a few other times, the number of tokens in use is much lower (due to awaiting of job dependencies or approaching job completion).

This feature is based on a model of big data job execution that allows the estimation of degrees of parallelism available in each stage (grouping of parallel tasks) in the execution plan. This is coupled with a method that uses the execution time from a single run of the query in the distributed system to derive relationships across execution stages and derive the maximum amount of parallelism across the whole job. This leads to an estimation of the maximum usable number of allocation units (tokens). Such leads to better resource allocation, and more optimal balances between resource usage and job computation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors;
one or more computer-readable media having thereon computer-executable instructions that are structured such that, when executed by the one or more processors, the computing system is caused to perform the following:
compiling a job description of a computational job into an execution structure, the execution structure comprising a plurality of vertices that are to be performed upon one or more of a set of resources in an execution environment;
repeatedly simulating processing of the computational job, the simulation of processing using dependencies between vertices and historical data regarding the processing of instances of such vertices, and each simulation changing one or more parameters in the execution environment, including specifying a particular set of resources upon which the plurality of vertices are to be performed;

from the repeated simulating processing,
during each simulation and while changing the one or more parameters, estimating a degree of parallelism available during the each simulation,
deriving relationships across a plurality of execution stages of the computational job, and,
using the estimated degrees of parallelism available and the derived relationships across the plurality of execution stages, estimating a maximum amount of parallelism available for execution of the entire computational job;

presenting results of the multiple simulations in a user interface, the results including the degree of parallelism available with a specified one or more particular set of resources; and presenting a control in the user interface that enables a user to select an actual set of resources to be used in performing the computational job, where upon the user using the control, the selected actual set of resources are allocated for the computational job, and the computational job is performed using the selected actual set of resources.

2. The computing system in accordance with claim 1, at least some of the plurality of sets of resources having a different number of processing nodes.

3. The computing system in accordance with claim 1, at least some of the plurality of sets of resources having a different amount of memory.

4. The computing system in accordance with claim 1, the user interface presenting results of the multiple simulations in graph form with the resource set represented on one axis and with the duration of the computational job on another axis.

5. The computing system in accordance with claim 1, the user interface also having a control that the user may interact with in order to select the set of resources to be used in performing the computational job.

6. A computing system comprising:
one or more processors;
one or more computer-readable media having thereon computer-executable instructions that are structured such that, when executed by the one or more processors, the computing system is caused to perform the following:
compiling a job description of a computational job into an execution structure, the execution structure comprising a plurality of vertices that are to be performed upon one or more of a set of resources in an execution environment;
repeatedly simulating processing of the computational job, the simulation of processing using dependencies between vertices and historical data regarding the processing of instances of such vertices, and each simulation changing one or more parameters in the execution environment, including specifying a particular set of resources upon which the plurality of vertices are to be performed;
from the repeated simulating processing,
during each simulation and while changing the one or more parameters, estimating a degree of parallelism available during the each simulation,
deriving relationships across a plurality of execution stages of the computational lob, and using the estimated degrees of parallelism available and the derived relationships across the plurality of execution stages, estimating a maximum amount of parallelism available for execution of the entire computational job;
compiling results of the repeated simulations, compiling results including the estimated degree of parallelism available during each simulation while changing the one or more parameters and the maximum amount of parallelism available for execution of the entire computational job; and
applying a set of one or more rules to the compiled results of the repeated simulations to select one or more recommended sets of resources for performing the computational job, wherein applying the set of one or more rules includes determining execution times based at least in part on the estimated degrees of parallelism.

7. The computing system in accordance with claim 6, at least some of the plurality of sets of resources having a different number of processing nodes.

8. The computing system in accordance with claim 6, at least some of the plurality of sets of resources having a different amount of memory.

9. The computing system in accordance with claim 6, the one or more computer-readable media further having thereon computer-executable instructions that are structured such that, when executed by the one or more processors, the computing system is further caused to perform the following:
automatically initiating allocation of one of the recommended sets of resources, and performing the computational job using the recommended set of resources.

10. The computing system in accordance with claim 6, the set of one or more rules including a maximum useful time for performing the computational job.

11. The computing system in accordance with claim 6, the set of one or more rules including a time that the computational job should be completed by.

12. The computing system in accordance with claim 6, the set of one or more rules including an indication that as many resources as possible should be allocated so long as each addition resource unit contributes a certain amount to reduced duration.

13. A method for simulating performance of a computational job using variable numbers of resources, the method comprising:
compiling a job description of a computational job into an execution structure, the execution structure comprising a plurality of vertices that are to be performed upon one or more of a set of resources in an execution environment;
repeatedly simulating processing of the computational job, the simulation of processing using dependencies between vertices and historical data regarding the processing of instances of such vertices, and each simulation changing one or more parameters in the execution environment, including specifying a particular set of resources upon which the plurality of vertices are to be performed;
from the repeated simulating processing,
during each simulation and while changing the one or more parameters, estimating a degree of parallelism available during the each simulation,
deriving relationships across a plurality of execution stages of the computational job, and
using the estimated degrees of parallelism available and the derived relationships across the plurality of execution stages, estimating a maximum amount of parallelism available for execution of the entire computational job;

compiling results of the repeated simulations, compiling results including the estimated degree of parallelism available during each simulation while changing the one or more parameters and the maximum amount of parallelism available for execution of the entire computational job; and using the results of the repeated simulations to select a set of resources to use in order to perform the computational job, wherein using the results of the repeated simulations to select a set of resources includes determining execution times based at least in part on the estimated degrees of parallelism.

14. The method in accordance with claim 13, wherein using the results of the repeated simulations to select a set of resources to use in order to perform the computational job comprises:

a user interface component presenting results of the multiple simulations to a user, the user interface having a control for the user selecting the set of resources to be used in performing the computational job.

15. The method in accordance with claim 14, wherein using the results of the repeated simulations to select a set of resources to use in order to perform the computational job further comprises:

detecting user interaction with the control; and in response to detecting user interaction with the control, allocating the set of resources for the computational job.

16. The method in accordance with claim 15, wherein using the results of the repeated simulations to select a set of resources to use in order to perform the computational job further comprises:

performing the computational job using the selected set of resources.

17. The method in accordance with claim 13, wherein using the results of the repeated simulations to select a set of resources to use in order to perform the computational job comprises:

a resource set recommendation component applying a set of one or more rules to selected one or more recommended sets of resources for performing the computational job.

18. The method in accordance with claim 17, wherein using the results of the repeated simulations to select a set of resources to use in order to perform the computational job further comprises:

the resource set recommendation module further automatically initiating allocation of one of the recommended sets of resources.

19. The method in accordance with claim 18, wherein using the results of the repeated simulations to select a set of resources to use in order to perform the computational job further comprises:

performing the computational job using the recommended set of resources.

20. The method in accordance with claim 13, the set of one or more rules including a maximum useful time for performing the computational job.

* * * * *